April 28, 1936.  H. C. HETHERINGTON  2,038,564
PROCESS FOR THE SYNTHESIS OF UREA
Filed Aug. 5, 1931
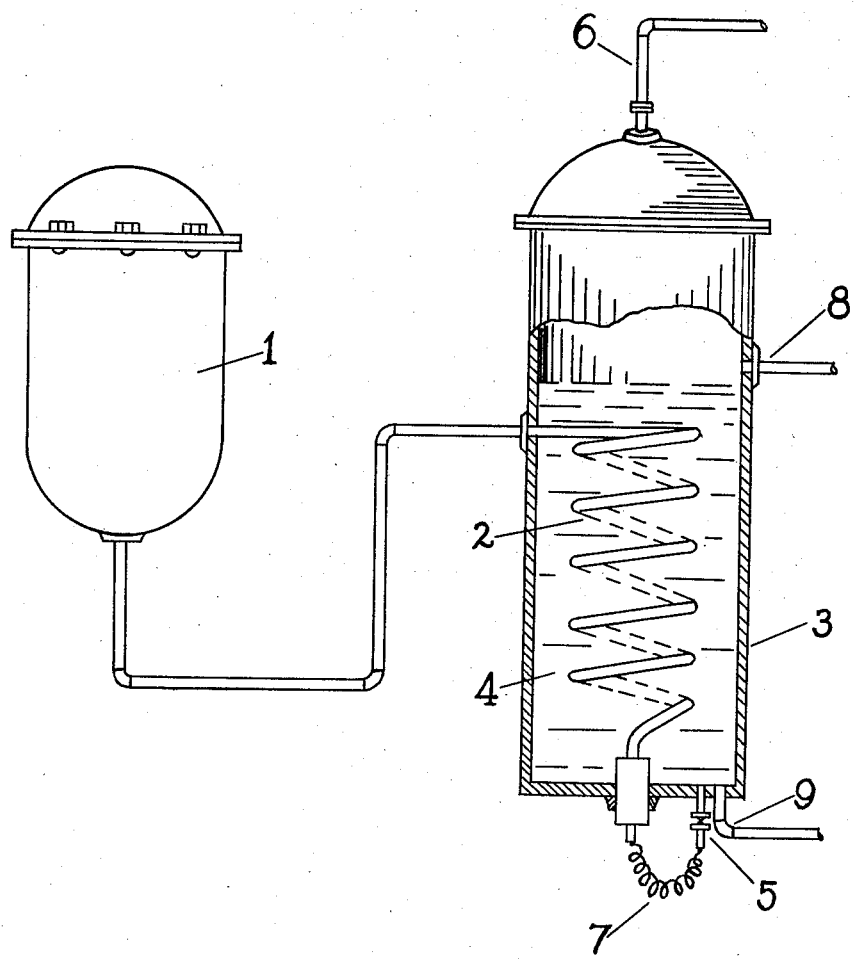
INVENTOR.
Harry C. Hetherington
BY
ATTORNEY.

Patented Apr. 28, 1936

2,038,564

UNITED STATES PATENT OFFICE 2,038,564

PROCESS FOR THE SYNTHESIS OF UREA

Harry C. Hetherington, Wilmington, Del., assignor to E. I. du Pont de Nemours & Company, Wilmington, Del., a corporation of Delaware Application August 5, 1931, Serial No. 555,181

6 Claims. (Cl. 260—125)

This invention relates to the synthesis of urea and more particularly to a method for withdrawal of the urea synthesis melt from the synthesis autoclave.

It is known that in the synthesis of urea, wherein ammonia and carbon dioxide or compounds thereof, with or without water, are subjected to high temperature and pressure within a closed vessel, a melt is produced which is of a highly corrosive nature.

It is also known that the urea synthesis melt, at the temperature of the synthesis, is characterized by relatively high autogenously developed pressure.

It has been previously proposed to effect the removal of the urea synthesis melt from the closed autoclave while utilizing a valve or valves whereby control can be exercised over the high pressure encountered and by use of which the pressure can be reduced. However, the combined high temperatures and pressures of the melt have an action upon valves and other apparatus heretofore employed which is highly undesirable, i. e. the valves quickly become corroded and eroded to such an extent as to reduce their useful life to a few hours. The cost of replacement of parts and of the shut-downs attendant upon such replacement operations impose an economic limitation upon the entire process.

The combined effects of erosion and corrosion, the one aggravating the effect of the other, present a problem of considerable practical importance in the efficient and economical synthesis and handling of urea, and accordingly it is an object of the present invention to provide a method whereby this problem is eliminated.

A further object of this invention is to provide an improved method for the removal of excess ammonia and/or unconverted ammonia and carbon dioxide from the urea synthesis melt.

Other objects and advantages of the invention will be apparent from the following specification in which the preferred embodiments are described and by reference to the accompanying drawing in which the figure is a diagrammatic representation in partial section of an arrangement of apparatus suitable for the practice of the invention.

I have discovered that the deleterious effects produced upon apparatus controlling the removal of urea synthesis melts from the urea synthesis autoclave may be overcome and excess ammonia and/or unconverted ammonia and carbon dioxide advantageously and economically removed therefrom by cooling the outcoming melt, passing said cooled melt thru a pressure-reducing conduit, and thereafter thru a control valve or valves into a vessel in which distillation of excess ammonia and/or unconverted ammonia and carbon dioxide can be effected.

This preliminary cooling of the melt greatly reduces its corrosive action and makes feasible the utilization of the pressure-reducing conduit hereinafter described which otherwise, under conditions of high autogenous pressure, would quickly deteriorate. It will be apparent that at this point the cooled melt, while having a relatively low autogenous pressure, is still under the full pressure hydraulically transmitted from the autoclave. This latter pressure may now be reduced by passage of the melt through a conduit, preferably in the form of a coil, of relatively small diameter, without danger of the rapid corrosion formerly associated with the handling of hot urea melts.

According to the present invention, therefore, I pass the cooled melt thru a pressure-reducing conduit of small diameter to lower the hydraulic pressure of the melt sufficiently to eliminate the highly erosive action thereof formerly caused by high hydraulic pressure and consequent high velocity thru a valve orifice.

As an added feature of my invention I so regulate the pressure and temperature of the urea melt after removal from the urea synthesis autoclave, hereinbefore described, as to distill at least a part of the excess ammonia and/or unconverted ammonia and carbon dioxide therefrom, by conveying the hot melt at or near the temperature of the synthesis in heat exchange relation with previous portions of said melt undergoing distillation.

The invention is more fully described and illustrated by the following example explained with reference to the accompanying drawing.

*Example.*—Ammonia and carbon dioxide in the proportion of 109 parts by weight of ammonia and 44 parts by weight of carbon dioxide are introduced, by means not shown, and subjected to urea-forming temperatures and pressures, i. e. 170° C. and about 150 atmospheres pressure, in autoclave (1) for approximately an hour. At the expiration of this period of time there is present in the autoclave a solution containing about 22 parts by weight of ammonium carbamate, 43.1 parts of urea, 30.9 parts of water, and 75 parts ammonia.

Upon completion of the reaction and at a temperature of about 170° C. the autogenously developed pressure on the surface of the urea melt is of the magnitude of 2200 pounds per square inch.

Previously it has been proposed to control the removal of such a urea melt by means of a valve as indicated by the dotted line at (B), which is rapidly attacked by the erosive and corrosive properties of the melt, as hereinbefore described.

According to this invention, however, the urea melt at the temperature of 170° C., above indicated, is conducted thru the cooling coil (2), contained in vessel (3), and in heat exchange relation with previous portions of the melt (4), which are at a temperature of about 77° C. While passing thru cooling coil (2), the temperature of the melt is lowered to approximately 80° C. and the autogenous pressure is thereby reduced to about 200 pounds per square inch, although, as previously stated, the melt is still subjected to the full hydraulic pressure transmitted from the autoclave (1).

At this lowered temperature the corrosive action of the melt is so considerably decreased as to make possible the substantial elimination of the hydraulic pressure above described by the utilization of a pressure-reducing conduit of relatively small diameter (7).

The friction produced by passage of the melt thru pressure-reducing coils (7) causes an increase in temperature of about 10° C. whereby the autogenous pressure of the melt is raised somewhat, i. e. to the neighborhood of about 500 pounds per square inch, but this temperature increase is not of sufficient magnitude as to markedly increase the corrosive action of the melt upon control valve (5).

The melt, now deprived of its rapid corrosive action by a considerable lowering of the temperature, and of its erosive action by lowering of hydraulic pressure, is passed thru control valve (5) into previous portions of the melt contained in vessel (3). As the melt passes thru valve (5) a reduction of temperature of the melt takes place, due to liberation of ammonia upon its passage thru the valve, to about 77° C.

The autogenous pressure of the melt in vessel (3) is of sufficient magnitude to allow the recovery of excess ammonia by vaporization thru outlet (6), and liquefaction in condensers of conventional design, not shown. Thereafter the melt may be removed from vessel (3) by means of outlets (8) and (9).

As an example of the composition of a urea melt subjected to excess ammonia recovery as above described, a melt in autoclave (1), of the following parts by weight: urea 43.1, carbamate 22.0, water 30.9, excess ammonia 75.0,—is found to have the following composition after the above described excess ammonia recovery: urea 43.1, carbamate 22.0, water 30.9, and excess ammonia 25.3.

Various changes may be made in the manner and details of operation of the invention without departing therefrom or sacrificing any of the advantages thereof.

I claim:
1. In a process for the synthesis of urea by reaction of ammonia and carbon dioxide at elevated temperatures and pressures in a closed autoclave the method of withdrawing the urea synthesis melt from the urea synthesis autoclave which comprises passing said melt in heat exchange relation to but not in actual contact with a cooling medium, thereafter passing said melt thru a pressure-reducing conduit of restricted diameter, and controlling the rate of flow of said melt from said conduit by a valve.

2. In a process for the synthesis of urea by reaction of ammonia and carbon dioxide at elevated temperature and pressure in a closed vessel, the method of withdrawing the urea synthesis melt from the urea synthesis autoclave, which comprises passing said melt in heat exchange relation to but not in actual contact with previous portions of said melt, thereafter passing said melt thru a pressure-reducing conduit of restricted diameter, and controlling the rate of flow from said conduit by a valve.

3. In a process for the synthesis of urea by reaction of ammonia and carbon dioxide at elevated temperatures and pressures in a closed autoclave, the method of withdrawing the urea synthesis melt from the urea synthesis autoclave, which comprises passing said melt in heat exchange relation to but not in actual contact with previous portions of said melt, thereafter passing said melt thru a pressure-reducing conduit of restricted diameter into a still maintained in heat exchange relation with said incoming melt, and distilling excess ammonia therefrom.

4. In a process for the synthesis of urea by reaction of ammonia and carbon dioxide at elevated temperatures and pressures in a closed autoclave, the method of reducing apparatus corrosion in withdrawing the urea synthesis melt from the urea synthesis autoclave by reduction of the autogenous and hydraulic pressure of said melt, characterized by the fact that said melt is passed in heat exchange relation to but not in actual contact with a cooling medium, thereafter passed thru a pressure-reducing conduit of restricted diameter into a still in heat exchange relation to said incoming melt and therein excess ammonia distilled from said melt.

5. In a process of synthesizing urea which comprises reacting ammonia and carbon dioxide or compounds thereof at elevated temperatures and pressures in a closed autoclave and withdrawing the formed urea synthesis melt from the autoclave, the rate of delivery thereof being controlled by a valve, the step of cooling said melt before passage thereof through said valve.

6. In a process of synthesizing urea by reaction of ammonia and carbon dioxide or compounds thereof at elevated temperatures and pressures wherein unconverted raw materials are recovered from the synthesis melt by distillation at a lower temperature and pressure, the step of conveying the synthesis melt, before substantial reduction of temperature or pressure, in heat exchange relation with previous portions of said melt undergoing distillation.

HARRY C. HETHERINGTON.